(12) United States Patent
Pan et al.

(10) Patent No.: US 10,684,514 B2
(45) Date of Patent: Jun. 16, 2020

(54) DISPLAY PANEL (71) Applicant: Himax Display, Inc., Tainan (TW)

(72) Inventors: Po-Hung Pan, Tainan (TW); Hsing-Lung Wang, Tainan (TW); Kuan-Hsu Fan-Chiang, Tainan (TW); Yuet-Wing Li, Tainan (TW); Ya-Jou Chen, Tainan (TW); Tung-Feng Wu, Tainan (TW); Chia-Yeh Tsai, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 16/003,134

(22) Filed: Jun. 8, 2018

(65) Prior Publication Data
US 2019/0377212 A1  Dec. 12, 2019

(51) Int. Cl.
*G02F 1/1337* (2006.01)
*G02F 1/1339* (2006.01)

(52) U.S. Cl.
CPC ........ *G02F 1/13378* (2013.01); *G02F 1/1339* (2013.01); *G02F 1/133723* (2013.01); *G02F 1/133734* (2013.01); *G02F 2001/133742* (2013.01)

(58) Field of Classification Search
CPC ........... G02F 1/133788; G02F 1/13378; G02F 1/133723; G02F 1/1339; G02F 1/133734; G02F 2001/133742
USPC ........................................................ 349/123
See application file for complete search history.

(56) References Cited

U.S. PATENT DOCUMENTS

| 5,381,255 A * | 1/1995 | Ohnuma | G02F 1/1339 349/106 |
|---|---|---|---|
| 9,885,920 B2 | 2/2018 | Park et al. | |
| 2011/0051064 A1* | 3/2011 | Matsumori | G02F 1/133711 349/123 |
| 2011/0157531 A1* | 6/2011 | Suwa | G02F 1/133711 349/124 |

(Continued)

FOREIGN PATENT DOCUMENTS

| CN | 101126871 | 2/2008 |
|---|---|---|
| TW | I314664 | 9/2009 |

OTHER PUBLICATIONS

"Office Action of Taiwan Counterpart Application", dated Jun. 18, 2019, p. 1-p. 9.

*Primary Examiner* — Charles S Chang
(74) *Attorney, Agent, or Firm* — JCIPRNET (57) ABSTRACT

A display panel includes a first substrate and a second substrate assembled together with a sealant, and the resultant assembly encloses a display medium layer. An organic alignment layer and an inorganic alignment layer are disposed between the first substrate and the display medium layer. A first gap exists between the inorganic alignment layer and the sealant, and the organic alignment layer is located in the first gap. The inorganic alignment layer may contact the display medium layer, and the organic alignment layer may be in contact with the display medium layer in the first gap. A portion of the organic alignment layer may overlap the inorganic alignment layer. The inorganic alignment layer may be coated with a coating of hydrophobic molecules. The display panel may further include an opposite organic alignment layer and an opposite inorganic alignment layer between the second substrate and the display medium layer.

18 Claims, 8 Drawing Sheets

(56) References Cited

U.S. PATENT DOCUMENTS

2013/0083277 A1* 4/2013 Yamamoto ........... G02B 5/3016
                                                349/123
2016/0147116 A1* 5/2016 Park ................. G02F 1/133711
                                                349/129

* cited by examiner

DISPLAY PANEL

BACKGROUND OF THE INVENTION

1. Field of the Invention

The present invention generally relates to an electronic device, in particular, to a display panel.

2. Description of Related Art

Liquid crystal display panels are generally disposed with alignment layers to interface with the liquid crystal layer in order to orientate the liquid crystal molecules and induce a pre-tilt angle for the liquid crystal molecules. In a liquid crystal display panel, the liquid crystal layer is typically sandwiched between two alignment layers each on one substrate, and the two substrates are held together with a sealant that encloses the liquid crystal layer.

However, ensuring both the desired orientation of liquid crystal molecules near the interface with the sealant and a long lifetime of the display panel is at present a challenge.

SUMMARY OF THE INVENTION

A display panel is described that makes use of both an inorganic and organic alignment layers to avoid frame mura, defined as a light leakage around the sealant boundary or a marginal region of the layer of display medium molecules adjacent to the sealant, while maintaining a long lifetime and good optical performance of the display panel.

The disclosure provides a display panel including a first substrate, a second substrate assembled with the first substrate, a sealant disposed between the first substrate and the second substrate, a display medium layer disposed between the first substrate and the second substrate and surrounded by the sealant, an organic alignment layer disposed between the first substrate and the display medium layer, and an inorganic alignment layer disposed between the first substrate and the display medium layer. A first gap exists between the inorganic alignment layer and the sealant, and the organic alignment layer is located in the first gap.

In some embodiments, a portion of the organic alignment layer overlaps the inorganic alignment layer.

In some embodiments, the inorganic alignment layer is disposed between the display medium layer and the portion of the organic alignment layer.

In some embodiments, a surface of the organic alignment layer facing away from the display medium layer and a surface of the inorganic alignment layer facing away from the display medium layer are coplanar. The bottom surfaces of the organic and inorganic alignment layers are the surfaces of the organic and inorganic alignment layers facing away from the display medium layer.

In some embodiments, an edge of the organic alignment layer aligns with an edge of the sealant, and in other embodiments, the edge of the organic alignment layer aligns with an edge of the first substrate.

In some embodiments, the sealant is in contact with the organic alignment layer.

In some embodiments, a thickness of the organic alignment layer is in a range of a couple of hundreds to a couple of thousands of angstroms.

In some embodiments, a thickness of the inorganic alignment layer is between 200 and 2000 angstroms.

In some embodiments, a material of the organic alignment layer includes thermally curable polyimide or UV-curable polyimide.

In some embodiments, a surface of the organic alignment layer facing the display medium layer has a surface roughness between 0.2 and 0.8 nanometers.

In some embodiments, a material of the inorganic alignment layer includes obliquely deposited silicon oxide ($SiO_x$), zinc oxide (ZnO), or nanoporous anodic aluminum oxide.

In some embodiments, a surface of the inorganic alignment layer facing the display medium layer has a water contact angle of about 5 degrees.

In some embodiments, the surface of the inorganic alignment layer facing the display medium layer has a water contact angle between 20 and 40 degrees.

In some embodiments, the surface of the inorganic alignment layer facing the display medium layer has a water contact angle greater than 60 degrees.

In some embodiments, a hydrophobic material layer is disposed on the surface of the inorganic alignment layer facing the display medium layer.

In some embodiments where the surface of the inorganic alignment layer facing the display medium layer has the hydrophobic material layer, the hydrophobic material layer includes hydrophobic molecules such as silanes, fluorinated silanes, acids, or long-chain alcohols.

In some embodiments, the display panel further includes an opposite organic and an opposite inorganic alignment layers both disposed between the second substrate and the display medium layer. In these embodiments, a second gap exists between the opposite inorganic alignment layer and the sealant, and the opposite organic alignment layer is located in the second gap.

In some embodiments, the opposite inorganic alignment layer is in contact with the display medium layer.

In some embodiments, a surface of the opposite inorganic alignment layer facing the display medium layer has a water contact angle greater than 60 degrees.

In view of the above, the organic alignment layer disposed adjacent to the sealant provides improved anchoring energy of the display medium molecules, thereby avoiding leakage of light at a marginal region of the display medium layer next to the sealant and so avoiding the emergence of frame mura. Additionally, the inorganic alignment layer disposed adjacent to a central region of the display medium layer has improved resistance to UV light compared to the organic alignment layer. Therefore, the use of a primarily inorganic alignment layer lengthens the lifetime of the display panel. Accordingly, the above described combination of organic and inorganic alignment layers disposed between one or each of the substrates and the display medium layer may prevent or mitigate the emergence of frame mura and thereby improve the quality of the display panel, while maintaining a long lifetime of the display panel.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles presented in the disclosure. Identical or similar numbers refer to identical or similar elements throughout the drawings.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts. Same or similar reference numbers in the description of the embodiments represent same or similar elements or components.

Figure 1:
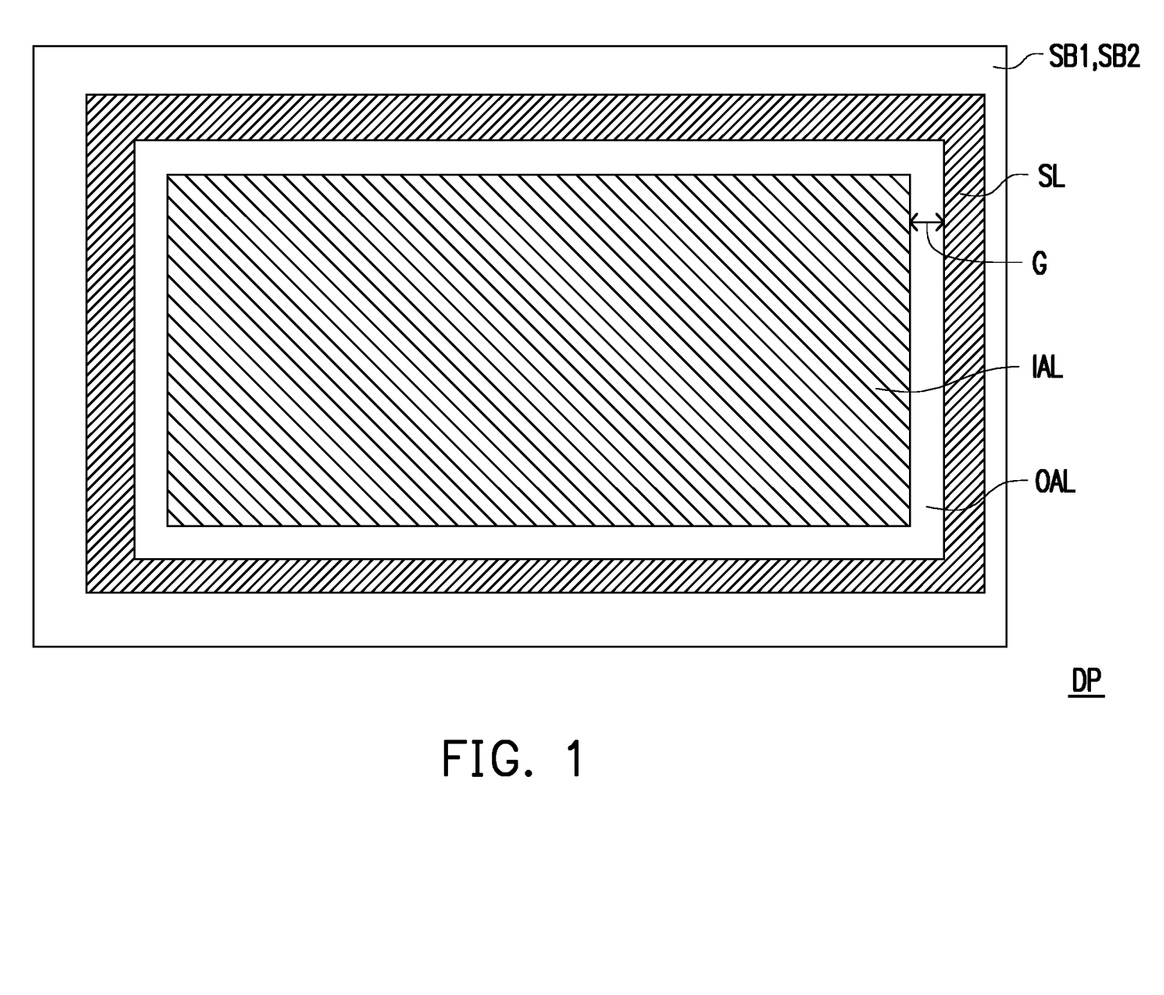
FIG. 1 schematically illustrates a top view of a display panel in accordance with an embodiment of the present disclosure.

FIG. 1 schematically illustrates a top view showing some components of a display panel DP. Referring to FIG. 1, the display panel DP may include a first substrate SB1, a second substrate SB2, a sealant SL, a display medium layer 140, an organic alignment layer OAL and an inorganic alignment layer IAL. Specifically, the first substrate SB1 and the second substrate SB2 are stacked in a top and bottom manner and the sizes of the two substrates may be similar so that FIG. 1 shows the outline of the first substrate SB1 and the outline of the second substrate SB2 being aligned. The sealant SL is disposed between the first and second substrates SB1 and SB2. The sealant SL, as viewed from above, has a frame-like pattern completely surrounding a display medium layer (not shown) being sandwiched between the first and second substrates SB1 and SB2. The inorganic alignment layer IAL is disposed within the enclosure formed by the sealant SL and spaced apart from the sealant SL by the gap G. The organic alignment layer OAL is at least disposed in the gap G. The inorganic alignment layer IAL and the organic alignment layer OAL are in contact with the display medium layer such as liquid crystal layer and are used for orientating the liquid crystal molecules and inducing a pre-tilt angle for the liquid crystal molecules. In the embodiment, the inorganic alignment layer IAL is spaced apart from the sealant SL by the gap G so that the inorganic alignment layer IAL is not in contact with the sealant SL. The organic alignment layer OAL formed in the region of the gap G may be in contact with the sealant SL at the inner perimeter of the sealant SL.

Figure 2:
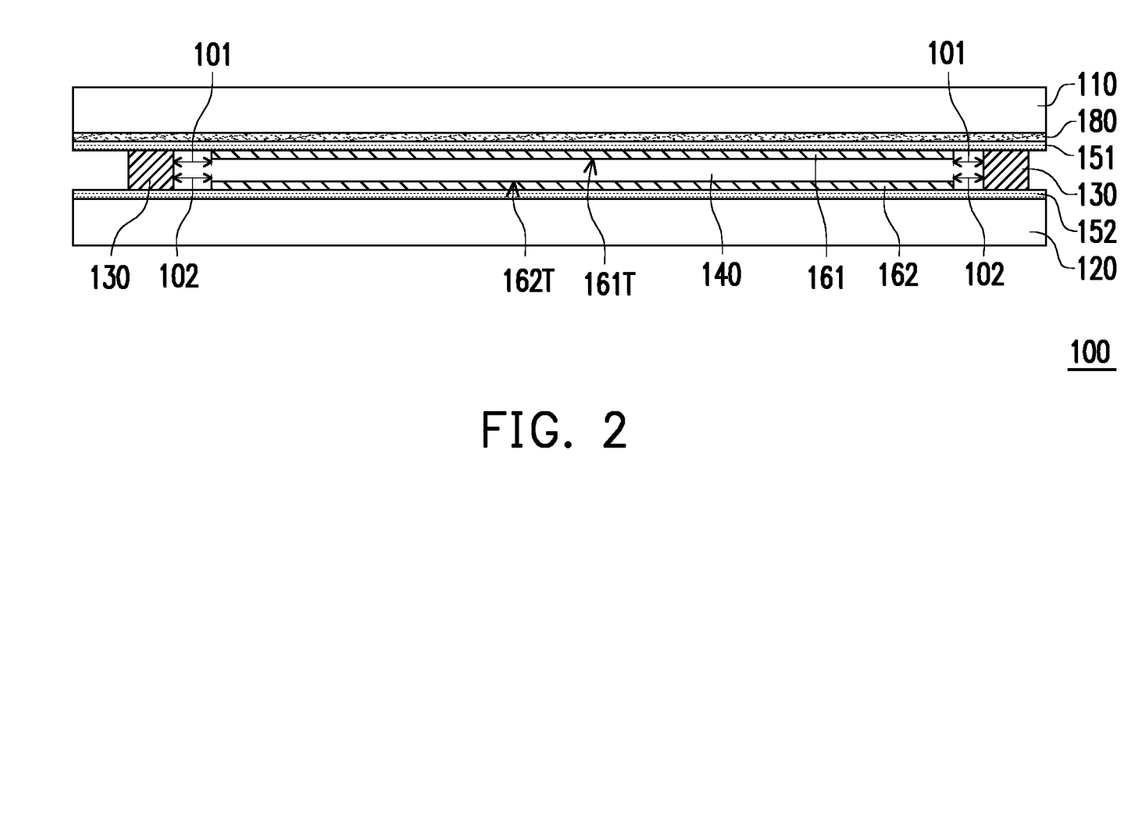
FIGS. 2 to 13 each schematically illustrates a side cross-sectional view of a display panel according to an embodiment of the present disclosure.

FIG. 2 schematically illustrates a side cross-sectional view of a display panel in accordance with an embodiment of the present disclosure. Referring to FIG. 2, a display panel 100 includes a first substrate 110, a second substrate 120, a sealant 130, a display medium layer 140, an organic alignment layer 151, an inorganic alignment layer 161, an opposite organic alignment layer 152 and an opposite inorganic alignment layer 162. The display panel 100 may have a top view similar to the display panel DP in FIG. 1, where the inorganic alignment layer IAL in FIG. 1 may present the top view of at least one of the inorganic alignment layer 161 and the opposite inorganic alignment layer 162, and the organic alignment layer OAL in FIG. 1 may present the top view of at least one of the organic alignment layer 151 and the opposite organic alignment layer 152.

In FIG. 2, the first substrate 110 and the second substrate 120 are arranged opposite to each other and the sealant 130 is disposed between the first substrate 110 and the second substrate 120. Specifically, the first substrate 110 and the second substrate 120 are assembled with each other via the sealant 130. The display medium layer 140 is disposed between the first substrate 110 and the second substrate 120 and surrounded by the sealant 130. The organic alignment layer 151 and inorganic alignment layer 161 are both disposed between the first substrate 110 and the display medium layer 140. A first gap 101 exists between the inorganic alignment layer 161 and the sealant 130, and the organic alignment layer 151 is located in the first gap 101. The opposite organic alignment layer 152 and the opposite inorganic alignment layer 162 are both disposed between the second substrate 120 and the display medium layer 140. A second gap 102 exists between the opposite inorganic alignment layer 162 and the sealant 130, and the opposite organic alignment layer 152 is located in the second gap 102. The second gap 102 may be similar to the first gap 101 and have the top view as the gap G shown in FIG. 1, and properties of the organic alignment layers 151 and the inorganic alignment layer 161, including materials thereof, may be the same as the corresponding opposite organic alignment layer 152 and the corresponding opposite organic alignment layer 162, but the invention is not limited thereto.

The first substrate 110 and the second substrate 120 are disposed at two opposite sides of the sealant 130 and are arranged substantially parallel to each other. The display medium layer 140 is encased by the first substrate 110, the second substrate 120 and the sealant 130. The material of the display medium layer 140 may be liquid crystal material so that the first substrate 110, the second substrate 120, the display medium layer 140 and the sealant 130 may serve as a liquid crystal cell.

The material of the first substrate 110 may be glass, quartz, or the like. The display panel 100 further includes an electrode layer 180 disposed on a surface of the first substrate 110 facing the display medium layer 140. However, the present disclosure is not limited thereto, as, for example, the electrode layer 180 may be disposed on a surface of the second substrate 120 facing the display medium layer 140. The material of the electrode layer 180 may be a transparent conductive material, such as indium tin oxide (ITO). The electrode layer 180 completely covers the surface of the first substrate 110 facing the display medium layer 140; alternatively, the electrode layer 180 may be patterned to have a required pattern.

Though the drawing of FIG. 2 presents the second substrate 120 as a plate-like structure, the second substrate 120 may be a transistor array substrate comprising a support substrate such as a glass plate, or a silicon backplane (not shown) and a transistor array such as a thin film transistor array or a CMOS (Complementary Metal-Oxide Semiconductor) device array (not shown) thereon, wherein the transistor array and the electrode layer 180 may be used to provide the driving electric field to drive the display medium layer 140. In some embodiments, the display panel 100 may be a Thin Film Transistor Liquid Crystal Display (TFT-LCD) panel or an LCoS (Liquid Crystal on Silicon) display panel. In some alternative embodiments, the electrode layer 180 may be omitted based on the driving circuit design of the display panel 100.

The organic alignment layer 151 and the inorganic alignment layer 161 are located between the electrode layer 180 and the display medium layer 140. The organic alignment layer 151 is disposed on the electrode layer 180 and the electrode layer 180 is sandwiched between the organic alignment layer 151 and the first substrate 110. An edge of the organic alignment layer 151 aligns with an edge of the first substrate 110, such that the organic alignment layer 151 completely covers the surface of the first substrate 110 facing the display medium layer 140. The inorganic alignment layer 161 is disposed on the organic alignment layer 151 and sandwiched between the organic alignment layer 151 and the display medium layer 140. In addition, the inorganic alignment layer 161 overlaps a portion of the organic alignment layer 151 and is spaced apart from the sealant 130 by the first gap 101.

The opposite organic alignment layer 152 and the opposite inorganic alignment layer 162 are arranged similar to the organic alignment layer 151 and inorganic alignment layer 161, mirroring their arrangement. The opposite organic alignment layer 152 is disposed on the second substrate 120. An edge of the opposite organic alignment layer 152 aligns with an edge of the second substrate 120, such that the opposite organic alignment layer 152 completely covers the surface of the second substrate 120 facing the display medium layer 140. The opposite inorganic alignment layer 162 is disposed on the opposite organic alignment layer 152 and sandwiched between the opposite organic alignment layer 152 and the display medium layer 140. The opposite inorganic alignment layer 162 overlaps a portion of the opposite organic alignment layer 152 and is spaced apart from the sealant 130 by the second gap 102.

The fabrication process of the display panel 100 of FIG. 2 may include the following steps, but is not limited thereto, and the order of the steps is also not limited to the here presented order of the steps. The electrode layer 180 is disposed on a surface of the first substrate 110, where the surface is defined as a surface facing the display medium layer 140 in the finished display panel 100 as depicted in FIG. 2. The organic alignment layer 151 and the inorganic alignment layer 161 are sequentially disposed on the electrode layer 180. In addition, the opposite organic alignment layer 152 and the opposite inorganic alignment layer 162 are sequentially formed on the second substrate 120.

The method of forming the organic alignment layer 151 and the opposite organic alignment layer 152 may include ink-jet printing or spin-coating and may include further patterning, but the method is not limited thereto. Raw materials used for the formation of the organic alignment layers may include poly(amic acid) or polyimide, which may then be cured to form the organic alignment layer 151 and the opposite organic alignment layer 152. A resulting material of the organic alignment layer 151 and the opposite organic alignment layer 152 may include thermally curable polyimide or UV-curable polyimide. The organic alignment layer 151 and the opposite organic alignment layer 152 may have a thickness in a range of a couple of hundreds to a couple of thousands of angstroms.

Surfaces of the organic alignment layer 151 and the opposite organic alignment layer 152 facing the display medium layer 140 may have a surface roughness between 0.2 and 0.8 nanometers. Each of the organic alignment layer 151 and the opposite organic alignment layer 152 may act as a planarization layer and present a smooth surface for the latter formed inorganic alignment layer 161 and the opposite inorganic alignment layer 162 disposed directly thereon. Consequently, a low surface roughness of the surfaces of the alignment layers interfacing with the display medium removes or reduces any disruption to the desired anchoring effect on the display medium molecules of the display medium layer 140 that might be caused by any surface irregularities.

The method of forming the inorganic alignment layer 161 and the opposite inorganic alignment layer 162 may be by thermal evaporation of the desired material, such as obliquely deposited silicon oxide ($SiO_x$), zinc oxide (ZnO) or nanoporous anodic aluminum oxide, but the method is not limited thereto. The inorganic alignment layer 161 and the opposite inorganic alignment layer 162 may be patterned by, for example, using a mask during the thermal evaporation process to shield areas where the inorganic alignment layer 161 or the opposite inorganic alignment layer 162 is not desired. The inorganic alignment layer 161 and the opposite inorganic alignment layer 162 may respectively have a thickness between 200 and 2000 angstroms.

Thereafter, the first substrate 110 and the second substrate 120 are assembled via the sealant 130. The sealant 130 may be a light curable material so that a light or thermal curing step may be performed after joining the first substrate 110 and the second substrate 120 via the sealant 130. The material of the display medium layer 140, such as liquid crystals, may fill the space surrounded by the sealant 130, the first substrate 110 and the second substrate 120 via a vacuum injection process or one drop filling process.

In the embodiment of the display panel 100, the surface 161T of the inorganic alignment layer 161 and the surface 162T of the opposite inorganic alignment layer 162 are in direct contact with the display medium layer 140. In some embodiments, a material of the inorganic alignment layer 161 and the opposite inorganic alignment layer 162 is silicon oxide and at least one of the surfaces 161T and 162T may be cleaned, for example, by wet cleaning process with water jet, prior to assembly of the display panel 100. When cleaned, the surfaces 161T and 162T may have a water contact angle of about 5 degrees or less, which compares with a water contact angle between 20 and 40 degrees when not cleaned. A smaller water contact angle may facilitate a uniform pre-tilt angle and ensure a uniform vertical alignment of the material of the display medium layer 140 such as liquid crystals.

In the embodiment, the organic alignment layer 151 and the opposite organic alignment layer 152 are formed closer to the sealant 130 than the inorganic alignment layer 161 and the opposite inorganic alignment layer 162, respectively. The organic alignment material may provide a stronger anchoring effect than the inorganic alignment material, so that the organic alignment layer 151 and the opposite organic alignment layer 152 may provide sufficient anchoring force to prevent the frame mura caused by the interaction of the sealant 130 with the liquid crystals of the display medium layer 140.

The inorganic alignment material may present better reliability than the organic alignment material. For example, the inorganic alignment material may degrade slowly when exposed to higher temperatures or short wavelength light such as ultraviolet (UV) light. The inorganic alignment layer 161 and the opposite inorganic alignment layer 162 in the embodiment covers most area of the region surrounded by the sealant 130. As such, after being used for a long time or exposed under sunlight for a long period of time, the inorganic alignment layer 161 and the opposite inorganic alignment layer 162 may provide sufficient anchoring force to maintain the alignment of the liquid crystals of the display medium layer 140, so that the lifetime of the display panel 100 may be prolonged.

FIGS. 3 to 9 each schematically illustrates a side cross-sectional view of a display panel according to an embodiment of the present disclosure. Each of the embodiments depicted in FIGS. 2 to 9 will be described in turn omitting detail that is the same as that of the already described display panel 100 of FIG. 2.

Figure 3:
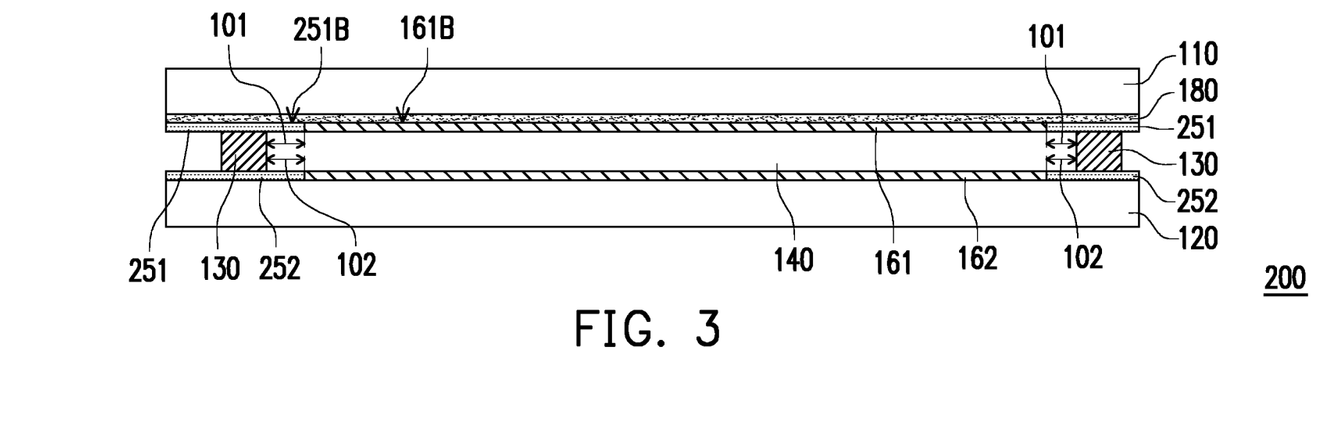

Regarding FIG. 3, the display panel 200 is similar to the display panel 100 of FIG. 2. The display panel 200 includes a first substrate 110, a second substrate 120, a sealant 130, a display medium layer 140, an electrode layer 180, an organic alignment layer 251, an inorganic alignment layer 161, an opposite organic alignment layer 252 and an opposite inorganic alignment layer 162. The first substrate 110, the second substrate 120, the sealant 130, the display medium layer 140, the electrode layer 180, the inorganic alignment layer 161 and the opposite inorganic alignment layer 162 may be similar to those depicted in FIG. 2. In FIG. 3, the organic alignment layer 251 extends from the edge of the inorganic alignment layer 161 to an edge of the first substrate 110 and substantially locates within the first gap 101. A surface 161B of the inorganic alignment layer 161 and a surface 251B of the organic alignment layer 251 are coplanar. The surface 161B of the inorganic alignment layer 161 and the surface 251B of the organic alignment layer 251 are the surfaces of the respective layers facing away from the display medium layer 140 and toward the respective substrate and can be considered as the bottom surfaces.

In the embodiment, the opposite inorganic alignment layer 162 and the opposite organic alignment layer 252 are arranged similarly to the inorganic alignment layer 161 and the organic alignment layer 251, mirroring their arrangement. That is, the opposite organic alignment layer 252 extends from the edge of the opposite inorganic alignment layer 162 to an edge of the second substrate 120. Bottom surfaces of the opposite inorganic alignment layer 162 and the opposite organic alignment layer 252 are coplanar. The bottom surfaces of the opposite inorganic alignment layer 162 and the opposite organic alignment layer 252 are the surfaces of the opposite inorganic alignment layer 162 and the opposite organic alignment layer 252 facing away from the display medium layer 140 and toward the second substrate 120.

The fabrication process of the display panel 200 differs from that of the display panel 100 in that, prior to assembly of the display panel 200, the inorganic alignment layer 161 and the organic alignment layer 251 are directly disposed on the electrode layer 180 and patterned to form a pattern as described above and shown in FIG. 3, and the opposite inorganic alignment layer 162 and the opposite organic alignment layer 252 are directly disposed on the second substrate 120 and patterned to form a pattern as described above and shown in FIG. 3.

Figure 4:
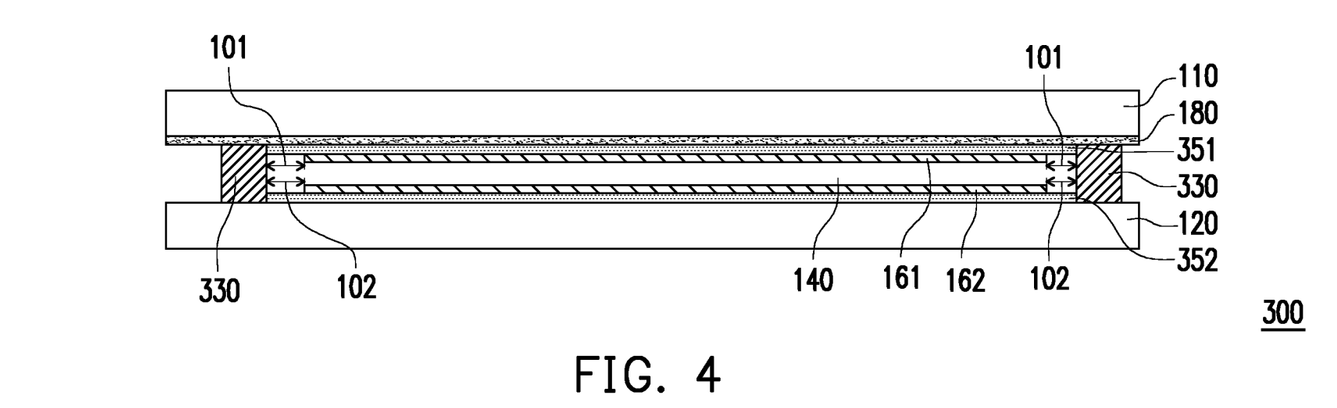

Regarding FIG. 4, the display panel 300 is similar to the display panel 100 of FIG. 2. The display panel 300 includes a first substrate 110, a second substrate 120, a sealant 330, a display medium layer 140, an electrode layer 180, an organic alignment layer 351, an inorganic alignment layer 161, an opposite organic alignment layer 352 and an opposite inorganic alignment layer 162. The first substrate 110, the second substrate 120, the display medium layer 140, the electrode layer 180, the inorganic alignment layer 161 and the opposite inorganic alignment layer 162 may be similar to those depicted in FIG. 2. In FIG. 4, an edge of the organic alignment layer 351 aligns with an edge of the sealant 330 and the sealant 330 is in contact with the organic alignment layer 351. More specifically, in the embodiment, the organic alignment layer 351 extends from a region where the inorganic alignment layer 161 is to an inner edge of the sealant 330, where the inner edge of the sealant 330 is the edge of the sealant 330 closest to the display medium layer 140. Therefore, a portion of the organic alignment layer 351 is located between the inorganic alignment layer 161 and the first substrate 110 and the other portion of the organic alignment layer 351 is disposed within the first gap 101. Similarly, a portion of the opposite organic alignment layer 352 is located between the opposite inorganic alignment layer 162 and the second substrate 120 and the other portion of the opposite organic alignment layer 352 is disposed within the second gap 102. In addition, an edge of the opposite organic alignment layer 352 aligns with an edge of the sealant 330 closest to the display medium layer 140. That is, the opposite organic alignment layer 352 extends to the inner edge of the sealant 330.

The fabrication process of the display panel 300 differs from that of the display panel 100 in that, prior to assembly of the display panel 300, the organic alignment layer 351 and the opposite organic alignment layer 352 are patterned to form a pattern as described above and shown in FIG. 4.

Figure 5:
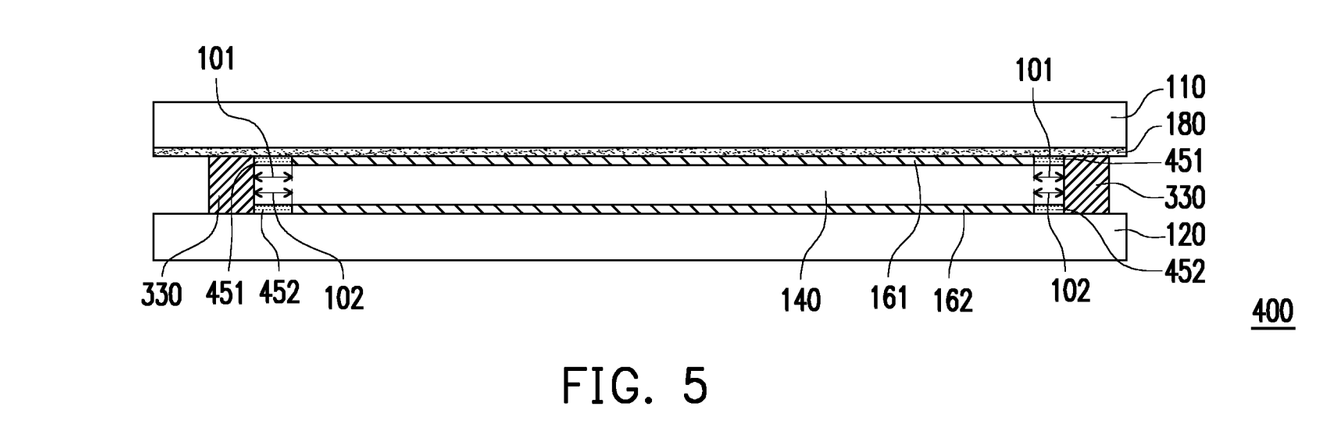
Figure 6:
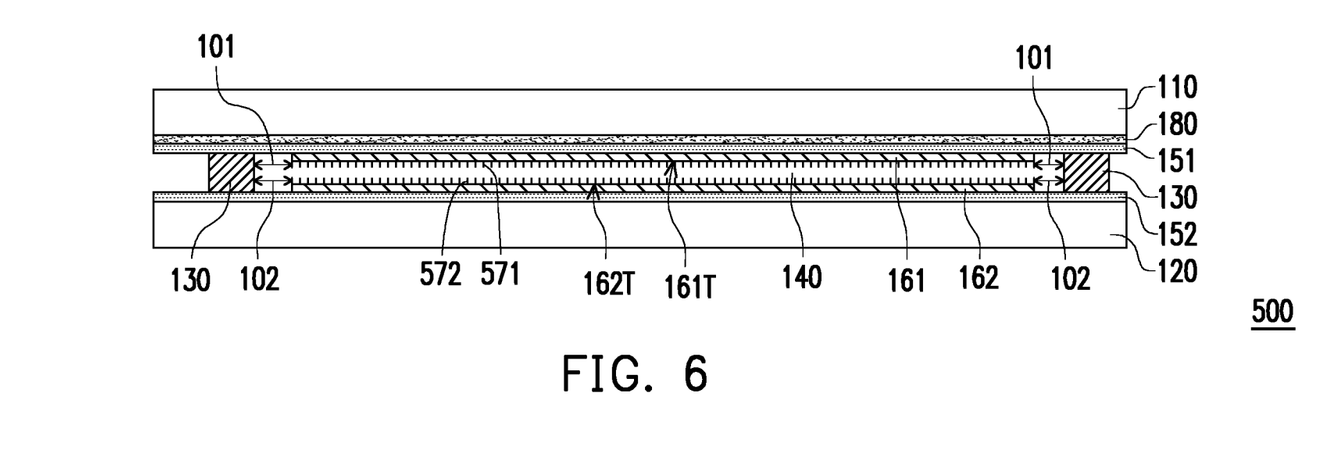

Regarding FIG. 5, the display panel 400 is similar to the display panel 200 of FIG. 3. The display panel 400 includes a first substrate 110, a second substrate 120, a sealant 330, a display medium layer 140, an electrode layer 180, an organic alignment layer 451, an inorganic alignment layer 161, an opposite organic alignment layer 452 and an opposite inorganic alignment layer 162. The first substrate 110, the second substrate 120, the display medium layer 140, the electrode layer 180, the inorganic alignment layer 161 and the opposite inorganic alignment layer 162 may be similar to those depicted in FIG. 3. In FIG. 5, the organic alignment layer 451 and the opposite organic alignment layer 452 extend to the inner edge of the sealant 330. In the embodiment, the organic alignment layer 451 and the inorganic alignment layer 161 are disposed on the first substrate 110 in a coplanar manner. A surface of the organic alignment layer 451 closest to the first substrate 110 may be coplanar with a surface of the inorganic alignment layer 161 closest to the first substrate 110. The organic alignment layer 451 may be substantially entirely disposed within the first gap 101. Similarly, the opposite organic alignment layer 452 may be entirely disposed within the second gap 102 and coplanar to the opposite inorganic alignment layer 162 at a side closest to the second substrate 120. In addition, the inorganic alignment layer 161 is absent in the first gap 101 and the opposite inorganic alignment layer 162 is absent in the second gap 102.

The fabrication process of the display panel 400 differs from that of the display panel 200 in that, prior to assembly of the display panel 400, the organic alignment layer 451 and the opposite organic alignment layer 452 are patterned to form a pattern as described above and shown in FIG. 5.

Regarding FIGS. 6 to 9, the display panels 500 to 800 are respectively similar to the display panels 100 to 400 of FIGS. 2 to 5. Each of the display panels 500 to 800 includes a first substrate 110, a second substrate 120, a display medium layer 140, an electrode layer 180, an inorganic alignment layer 161, an opposite inorganic alignment layer 162, a hydrophobic material layer 571 and an opposite hydrophobic material layer 572. The display panel 500 in FIG. 6 further includes a sealant 130, an organic alignment layer 151 and an opposite organic alignment layer 152, the display panel 600 in FIG. 7 further includes a sealant 130 and organic alignment layers 251 and 251, the display panel 700 in FIG. 8 further includes a sealant 330, an organic alignment layer 351 and an opposite organic alignment layer 352, and the display panel 800 in FIG. 9 further includes a sealant 330, an organic alignment layer 451 and an opposite organic alignment layer 452. The first substrate 110, the second substrate 120, the display medium layer 140, the electrode layer 180, the inorganic alignment layer 161, the opposite inorganic alignment layer 162, the respective sealant and the respective organic alignment layers may be similar to those depicted in any of FIGS. 2 to 5. In each of FIGS. 6 to 9, the hydrophobic material layer 571 and the opposite hydrophobic material layer 572 are respectively disposed on the surfaces 161T and 162T of the inorganic alignment layer 161 and the opposite inorganic alignment layer 162, the surfaces 161T and 162T being the surfaces of the inorganic alignment layer 161 and the opposite inorganic alignment layer 162 which interface with the display medium layer 140.

The hydrophobic material layer 571 and the opposite hydrophobic material layer 572 may include hydrophobic molecules, and the hydrophobic molecules may include molecules of silanes, fluorinated silanes, acids, or long-chain alcohols. For example, if the material of the inorganic alignment layer 161 and the opposite inorganic alignment layer 162 is obliquely deposited silicon oxide, then in some embodiments, a resulting silane sidechain is attached to silicon atoms at the surfaces 161T and 162T and may be Si—O—Si(ROH)$_2$—R'—CH$_3$ or Si—O—Si(ROH)$_2$—(CF$_2$)$_n$—CF$_3$, where R and R' are alkyl chains which may be different from each other and n represents the number, normally an integer, of the carbon atoms of the alkyl chain. In some embodiments including some embodiments with the aforementioned silane or a similar coating, the coated surfaces 161T and 162T of the inorganic alignment layer 161 and the opposite inorganic alignment layer 162 may have a water contact angle greater than 60 degrees. The increased hydrophobicity of the surfaces 161T and 162T due to the attached hydrophobic molecules, such as the above described molecules of silane, may further facilitate the pre-tilt angle and ensure the vertical alignment of the material of the display medium layer 140 such as liquid crystals.

The fabrication processes of the display panels 500 to 800 respectively differ from those of the display panels 100 to 400 in that, prior to assembly of the display panel, the hydrophobic material layer 571 and the opposite hydrophobic material layer 572 are respectively formed on the surfaces 161T and 162T of the inorganic alignment layer 161 and the opposite inorganic alignment layer 162.

The disposing of the hydrophobic material layer 571 and the opposite hydrophobic material layer 572 on the surfaces 161T and 162T of the inorganic alignment layer 161 and the opposite inorganic alignment layer 162 may involve a surface treatment or modification process, such as a silane surface treatment process through, for example, chemical vapor deposition. The surfaces 161T and 162T may be treated in isolation by shielding other areas beyond the inorganic alignment layer 161 and the opposite inorganic alignment layer 162 with the use of a mask or by selective deposition. In an instance, a region where the first gap 101 may be shielded during the formation of the hydrophobic material layer 571 and similarly, a region where the second gap 102 may be shielded during the formation of the opposite hydrophobic material layer 572, such that the organic alignment layer 251 and the opposite organic alignment layer 252 may not be subjected to the hydrophobic treatment.

Figure 10:
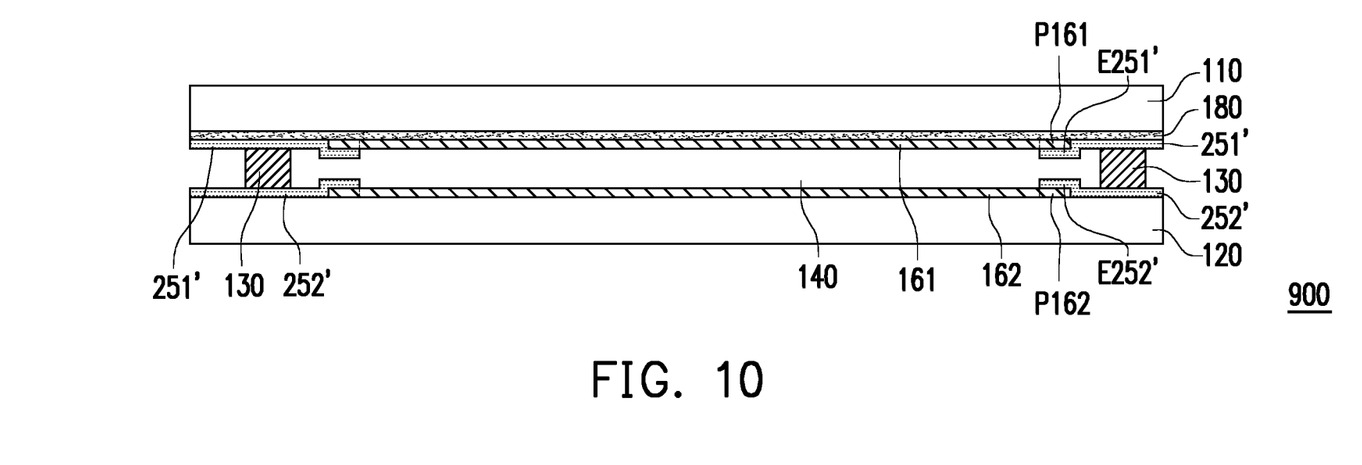

FIG. 10 schematically illustrates a display panel 900 similar to the display panel 200 of FIG. 3. In the present embodiment, the display panel 900 includes a first substrate 110, a second substrate 120, a sealant 130, a display medium layer 140, an electrode layer 180, an organic alignment layer 251', an inorganic alignment layer 161, an opposite organic alignment layer 252' and an opposite inorganic alignment layer 162, wherein the first substrate 110, the second substrate 120, the sealant 130, the display medium layer 140, the electrode layer 180, the inorganic alignment layer 161, and the opposite inorganic alignment layer 162 are substantially the same as those described in FIG. 3 and the details of these components are not reiterated here. Specifically, one difference between the display panel 900 and the display panel 200 lies in that the organic alignment layer 251' of the display panel 900 may partially overlap the inorganic alignment layer 161 and the opposite organic alignment layer 252' of the display panel 900 may partially overlap the opposite inorganic alignment layer 162.

As shown in FIG. 10, an extending portion E251' of the organic alignment layer 251' covers the peripheral portion P161 of the inorganic alignment layer 161 so that the peripheral portion P161 of the inorganic alignment layer 161 is sandwiched between the extending portion E251' of the organic alignment layer 251' and the electrode layer 180. Accordingly, the extending portion E251' of the organic alignment layer 251' is not coplanar with the rest portion of the organic alignment layer 251'. Similarly, an extending portion E252' of the opposite organic alignment layer 252' covers the peripheral portion P162 of the opposite inorganic alignment layer 162 so that the peripheral portion P162 of the opposite inorganic alignment layer 162 is sandwiched between the extending portion E252' of the opposite organic alignment layer 252' and the second substrate 120 and the extending portion E252' of the opposite organic alignment layer 252' is not coplanar with the rest portions of the opposite organic alignment layer 252'.

In the present embodiment, the inorganic alignment layer 161 may be formed on the first substrate 110 with a desired pattern prior to forming the organic alignment layer 251'. Subsequently, a non-patterned organic alignment layer is formed on the first substrate 110. The non-patterned organic alignment layer may cover the portion of the first substrate 110 with the inorganic alignment layer 161 thereon and the other portion of the first substrate 110 without the inorganic alignment layer 161 thereon. The non-patterned organic alignment layer may be patterned by an etching process such as a plasma etching to form the organic alignment layer 251' covering the peripheral portion P161 of the inorganic alignment layer 161 while exposing the rest portions of the inorganic alignment layer 161. Similarly, the opposite organic alignment layer 252' and the opposite inorganic alignment layer 162 may be fabricated by using the same process for fabricating the organic alignment layer 251' and the inorganic alignment layer 161.

Figure 11:
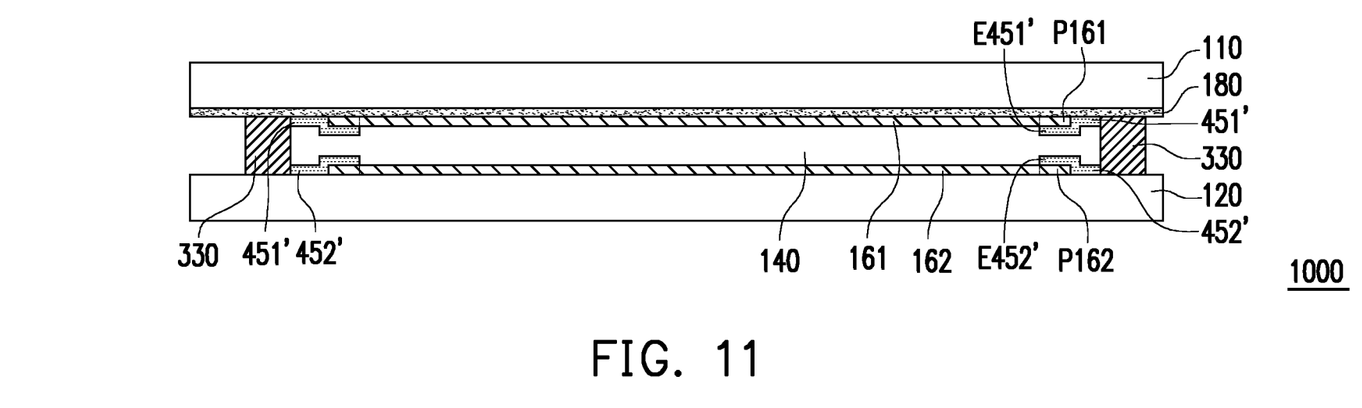

FIG. 11 schematically illustrates a display panel 1000 similar to the display panel 400 of FIG. 5. In the present embodiment, the display panel 1000 includes a first substrate 110, a second substrate 120, a sealant 330, a display medium layer 140, an electrode layer 180, an organic alignment layer 451', an inorganic alignment layer 161, an opposite organic alignment layer 452' and an opposite inorganic alignment layer 162, wherein the first substrate 110, the second substrate 120, the sealant 330, the display medium layer 140, the electrode layer 180, the inorganic alignment layer 161, and the opposite inorganic alignment layer 162 are substantially the same as those described in FIG. 5 and the details of these components are not reiterated here. Specifically, one difference between the display panel 1000 and the display panel 400 lies in that the organic alignment layer 451' of the display panel 1000 may partially overlap the inorganic alignment layer 161 and the opposite organic alignment layer 452' of the display panel 1000 may partially overlap the opposite inorganic alignment layer 162.

As shown in FIG. 11, an extending portion E451' of the organic alignment layer 451' covers the peripheral portion P161 of the inorganic alignment layer 161 so that the peripheral portion P161 of the inorganic alignment layer 161 is sandwiched between the extending portion E451' of the organic alignment layer 451' and the electrode layer 180. Accordingly, the extending portion E451' of the organic alignment layer 451' is not coplanar with the rest portion of the organic alignment layer 451'. Similarly, an extending portion E452' of the opposite organic alignment layer 452' covers the peripheral portion P162 of the opposite inorganic alignment layer 162 so that the peripheral portion P162 of the opposite inorganic alignment layer 162 is sandwiched between the extending portion E452' of the opposite organic alignment layer 452' and the second substrate 120 and the extending portion E452' of the opposite organic alignment layer 452' is not coplanar with the rest portions of the opposite organic alignment layer 452'.

In the present embodiment, the manufacturing method of the organic alignment layer 451' and the inorganic alignment layer 161 and the manufacturing method of the opposite organic alignment layer 452' and the opposite inorganic alignment layer 162 may be similar to the manufacturing method of the organic alignment layer 251' and the inorganic alignment layer 161 described in above. Namely, the organic alignment layer 451' or the opposite organic alignment layer 452' may be formed by patterning a non-patterned organic alignment layer that covers the inorganic alignment layer 161 or the opposite inorganic alignment layer 162.

Figure 7:
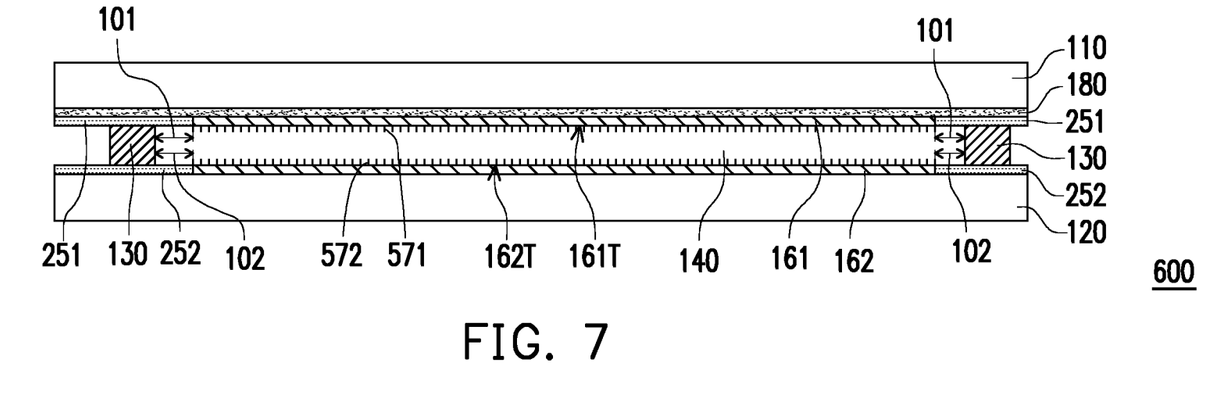
Figure 8:
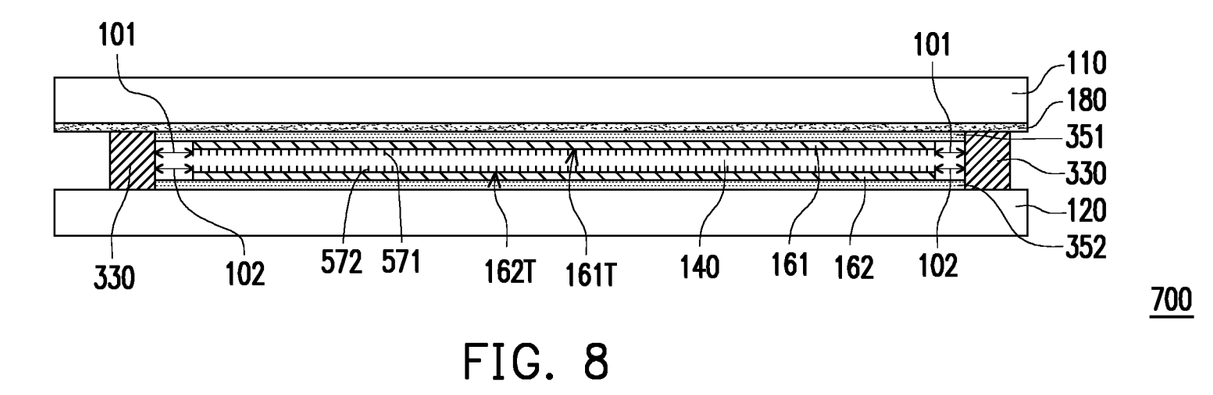
Figure 12:
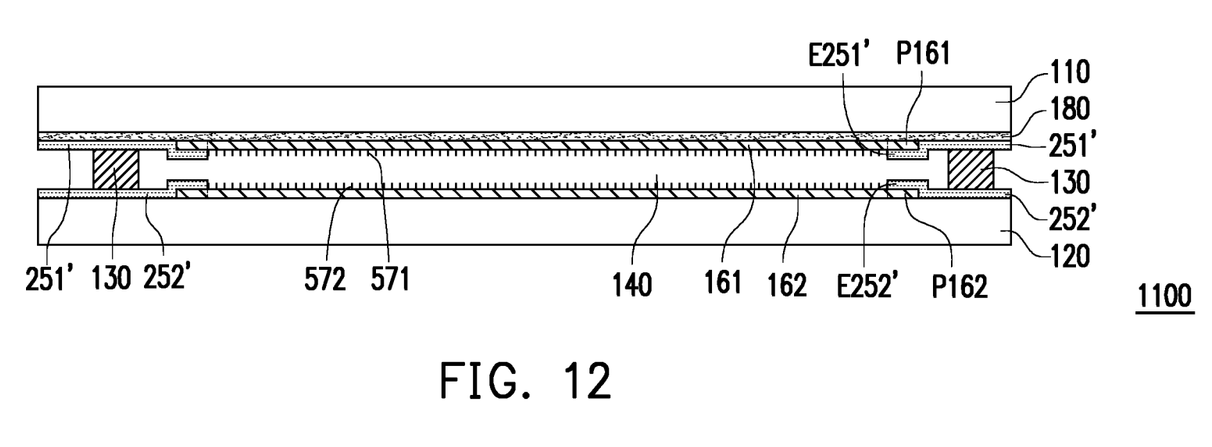

FIG. 12 schematically illustrates a display panel 1100 similar to the display panel 600 of FIG. 7. In the present embodiment, the display panel 1100 includes a first substrate 110, a second substrate 120, a sealant 130, a display medium layer 140, an electrode layer 180, an organic alignment layer 251', an inorganic alignment layer 161, an opposite organic alignment layer 252', an opposite inorganic alignment layer 162, a hydrophobic material layer 571 and an opposite hydrophobic material layer 572, wherein the first substrate 110, the second substrate 120, the sealant 130, the display medium layer 140, the electrode layer 180, the inorganic alignment layer 161, the opposite inorganic alignment layer 162, the hydrophobic material layer 571 and the opposite hydrophobic material layer 572 are substantially the same as those described in FIG. 7 and the details of these components are not reiterated here. Specifically, one difference between the display panel 1100 and the display panel 600 lies in that the organic alignment layer 251' of the display panel 1100 may partially overlap the inorganic alignment layer 161 and the opposite organic alignment layer 252' of the display panel 1100 may partially overlap the opposite inorganic alignment layer 162.

In the present embodiment, the disposition relationship and the fabricating method of the organic alignment layer 251' and the opposite organic alignment layer 252' and the disposition relationship and the fabricating method of the inorganic alignment layer 161 and the opposite inorganic alignment layer 162 may be referred those described in the embodiment of FIG. 10. As shown in FIG. 12, an extending portion E251' of the organic alignment layer 251' covers the peripheral portion P161 of the inorganic alignment layer 161. Accordingly, the extending portion E251' of the organic alignment layer 251' is not coplanar with the rest portion of the organic alignment layer 251'. Similarly, an extending portion E252' of the opposite organic alignment layer 252' covers the peripheral portion P162 of the opposite inorganic alignment layer 162 so that the extending portion E252' of the opposite organic alignment layer 252' is not coplanar with the rest portions of the opposite organic alignment layer 252'.

Figure 9:
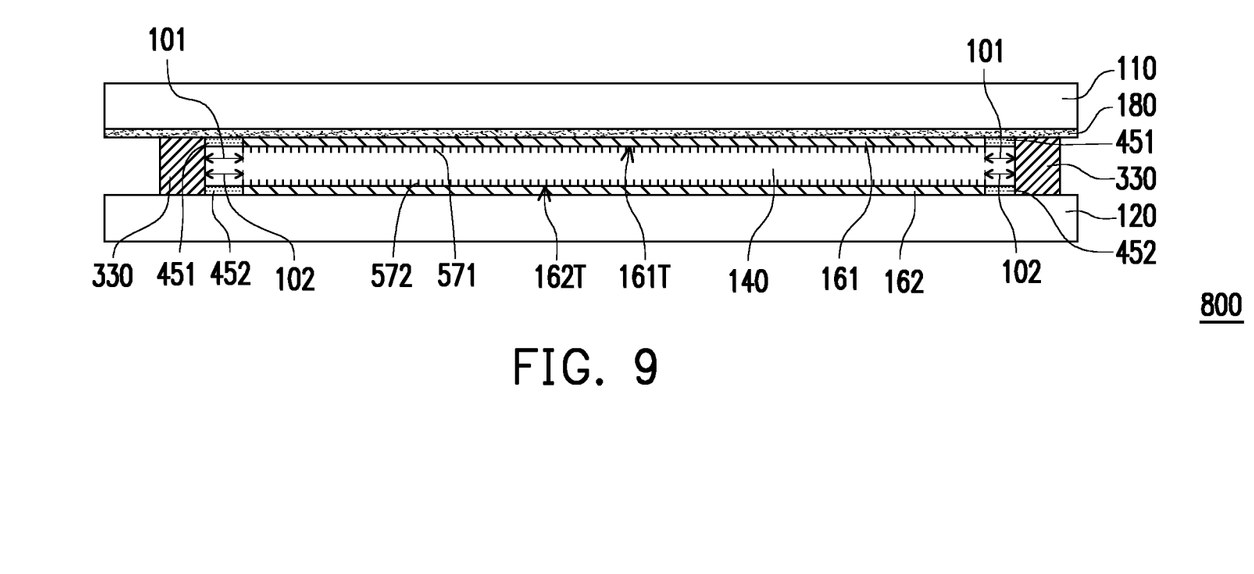
Figure 13:
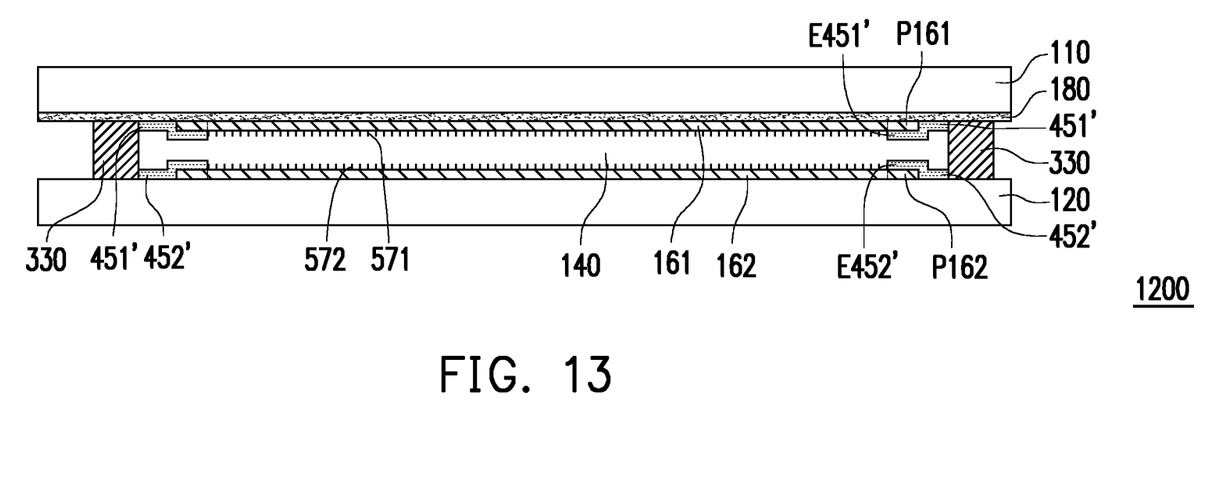

FIG. 13 schematically illustrates a display panel 1200 similar to the display panel 800 of FIG. 9. In the present embodiment, the display panel 1200 includes a first substrate 110, a second substrate 120, a sealant 330, a display medium layer 140, an electrode layer 180, an organic alignment layer 451', an inorganic alignment layer 161, an opposite organic alignment layer 452', an opposite inorganic alignment layer 162, a hydrophobic material layers 571 and an opposite hydrophobic material layer 572, wherein the first substrate 110, the second substrate 120, the sealant 330, the display medium layer 140, the electrode layer 180, the inorganic alignment layer 161, the opposite inorganic alignment layer 162, the hydrophobic material layer 571 and the opposite hydrophobic material layer 572 are substantially the same as those described in FIG. 9 and the details of these components are not reiterated here. Specifically, one difference between the display panel 1200 and the display panel 800 lies in that the organic alignment layer 451' of the display panel 1200 may partially overlap the inorganic alignment layer 161 and the opposite organic alignment layer 452' of the display panel 1200 may partially overlap the opposite inorganic alignment layer 162.

In the present embodiment, the disposition relationship and the fabricating method of the organic alignment layer 451' and the opposite organic alignment layer 452' and the disposition relationship and the fabricating method of the inorganic alignment 161 and the opposite inorganic alignment layer 162 may be referred those described in the embodiment of FIG. 11. As shown in FIG. 13, an extending portion E451' of the organic alignment layer 451' covers the peripheral portion P161 of the inorganic alignment layer 161. Accordingly, the extending portion E451' of the organic alignment layer 451' is not coplanar with the rest portion of the organic alignment layer 451'. Similarly, an extending portion E452' of the opposite organic alignment layer 452' covers the peripheral portion P162 of the opposite inorganic alignment layer 162 so that the extending portion E452' of the opposite organic alignment layer 452' is not coplanar with the rest portions of the opposite organic alignment layer 452'.

The above embodiments are depicted along with the drawings showing symmetric alignment layers, but the disclosure is not limited thereto. For example, the alignment structure including the organic alignment layer and the inorganic alignment layer or the alignment structure including the opposite organic alignment layer and the opposite inorganic alignment layer may selectively be omitted in any of the display panels 100 to 800. In addition, each of the organic alignment layers 151, 251, 251', 351, 451, and 451' may be combined with one of the opposite organic alignment layer 152, 252, 252', 352, 452, and 452' in the same display panel. For example, one display panel may include the organic alignment layer 151 on the first substrate and the opposite organic alignment layer 252 on the second substrate, or the like.

In view of the above, the display panel according to the embodiments of the disclosure is disposed with alignment layers on surfaces of the substrates (or any intervening layers, such as the electrode layer) that interface with the display medium layer. The display medium layer interfaces primarily with the inorganic alignment layers in a central area, resulting in an improved resistance to higher temperatures and UV light, and therefore a longer lifetime of the display panel. However, in a marginal area adjacent to the sealant, the display medium layer interfaces with the organic alignment layers, and these organic alignment layers provide a strong enough anchoring effect to prevent or mitigate the emergence of frame mura, such as light leakage, next to the sealant due to a lack of display medium molecule alignment caused by interaction of the molecules with the sealant, as would typically occur in a display panel that solely uses inorganic alignment layers. Accordingly, the combination of strategically placed organic and inorganic alignment layers prevents or mitigates the emergence of frame mura and thereby improves the quality of the display panel, while maintaining good optical performance and a long lifetime of the display panel.

It will be apparent to those skilled in the art that various modifications and variations can be made to the embodiments and concepts disclosed herein without departing from the scope or spirit of the invention. In view of the foregoing, it is intended that the present disclosure cover modifications and variations of this invention provided they fall within the scope of the following claims and their equivalents.

What is claimed is:
1. A display panel comprising:
a first substrate;
a second substrate assembled with the first substrate;
a sealant disposed between the first substrate and the second substrate;
a display medium layer disposed between the first substrate and the second substrate and surrounded by the sealant;
an organic alignment layer disposed between the first substrate and the display medium layer, wherein a material of the organic alignment layer comprises thermally curable polyimide or UV-curable polyimide; and
an inorganic alignment layer disposed between the first substrate and the display medium layer, wherein a first gap exists between the inorganic alignment layer and the sealant, and the organic alignment layer is located in the first gap,
wherein a surface of the organic alignment layer facing away from the display medium layer and a surface of the inorganic alignment layer facing away from the display medium layer are coplanar.
2. The display panel according to claim 1, wherein a portion of the organic alignment layer overlaps the inorganic alignment layer.
3. The display panel according to claim 2, wherein the inorganic alignment layer is disposed between the display medium layer and the portion of the organic alignment layer.
4. The display panel according to claim 1, wherein an edge of the organic alignment layer aligns with an edge of the sealant.
5. The display panel according to claim 1, wherein an edge of the organic alignment layer aligns with an edge of the first substrate.
6. The display panel according to claim 1, wherein the sealant is in contact with the organic alignment layer.
7. The display panel according to claim 1, wherein a thickness of the organic alignment layer is in a range of a couple of hundreds to a couple of thousands of angstroms.
8. The display panel according to claim 1, wherein a thickness of the inorganic alignment layer is between 200 and 2000 angstroms.
9. The display panel according to claim 1, wherein a surface of the organic alignment layer facing the display medium layer has a surface roughness between 0.2 and 0.8 nanometers.
10. The display panel according to claim 1, wherein a material of the inorganic alignment layer comprises obliquely deposited silicon oxide (SiOx), zinc oxide (ZnO), or nanoporous anodic aluminum oxide.
11. The display panel according to claim 1, wherein a surface of the inorganic alignment layer facing the display medium layer has a water contact angle of about 5 degrees.
12. The display panel according to claim 1, wherein a surface of the inorganic alignment layer facing the display medium layer has a water contact angle between 20 and 40 degrees.
13. The display panel according to claim 1, wherein a surface of the inorganic alignment layer facing the display medium layer has a water contact angle greater than 60 degrees.
14. The display panel according to claim 13, further comprising a hydrophobic material layer disposed on the surface of the inorganic alignment layer facing the display medium layer.
15. The display panel according to claim 14, wherein the hydrophobic material layer comprises hydrophobic molecules.
16. The display panel according to claim 1, further comprising:
an opposite organic alignment layer disposed between the second substrate and the display medium layer; and
an opposite inorganic alignment layer disposed between the second substrate and the display medium layer, wherein a second gap exists between the opposite inorganic alignment layer and the sealant, and the opposite organic alignment layer is located in the second gap.
17. The display panel according to claim 16, wherein the opposite inorganic alignment layer is in contact with the display medium layer.
18. The display panel according to claim 16, wherein a surface of the opposite inorganic alignment layer facing the display medium layer has a water contact angle greater than 60 degrees.

* * * * *